United States Patent
Yang et al.

(10) Patent No.: US 9,479,209 B2
(45) Date of Patent: Oct. 25, 2016

(54) PROVIDING POWER TO DUAL RADIO MODEMS

(75) Inventors: Huipeng Yang, Beijing (CN);
Changjiang Zhang, Beijing (CN);
Jianying Wen, Beijing (CN); Enjie Wang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 287 days.

(21) Appl. No.: 14/113,089

(22) PCT Filed: Apr. 22, 2011

(86) PCT No.: PCT/CN2011/073173
§ 371 (c)(1),
(2), (4) Date: Oct. 21, 2013

(87) PCT Pub. No.: WO2012/142770
PCT Pub. Date: Oct. 26, 2012

(65) Prior Publication Data
US 2014/0038672 A1    Feb. 6, 2014

(51) Int. Cl.
*H04B 1/38* (2015.01)
*H04B 1/3816* (2015.01)
*H04M 19/08* (2006.01)
*H04W 88/06* (2009.01)

(52) U.S. Cl.
CPC ............ *H04B 1/3816* (2013.01); *H04M 19/08* (2013.01); *H04W 88/06* (2013.01)

(58) Field of Classification Search
CPC .......... H04B 1/3816; H04M 2250/14; H04M 19/08; H04W 88/06
USPC ....................................................... 455/558
See application file for complete search history.

(56) References Cited

U.S. PATENT DOCUMENTS

| | | | | |
|---|---|---|---|---|
| 4,682,082 A | * | 7/1987 | MacAskill | H05B 41/2858 313/619 |
| 6,104,759 A | * | 8/2000 | Carkner | H04B 1/1607 307/31 |
| 6,263,192 B1 | * | 7/2001 | Alderton | H02M 3/156 455/557 |

(Continued)

FOREIGN PATENT DOCUMENTS

| CN | 201072878 | 6/2008 |
|---|---|---|
| CN | 101360288 | 2/2009 |
| CN | 101494694 | 7/2009 |

OTHER PUBLICATIONS

International Search Report received for corresponding Patent Cooperation Treaty Application No. PCT/CN2011/073173 , dated Feb. 2, 2012, 4 pages.

*Primary Examiner* — Nathan Mitchell
(74) *Attorney, Agent, or Firm* — Harrington & Smith

(57) ABSTRACT

Apparatus comprises: a first radio modem having an associated first radio frequency power amplifier; a second radio modem having an associated second radio frequency power amplifier; a terminal for connection to a battery; a capacitor having first and second terminals; a current limiting switch having input and output terminals; and a direct current-direct current converter having an input and an output. The terminal is coupled to the first radio frequency power amplifier, the terminal is coupled to the input of the current limiting switch, the output of the current limiting switch is coupled to both the first terminal of the capacitor and the input of the direct current-direct current convener, and the output of the direct current-direct current converter is coupled to the second radio frequency power amplifier.

19 Claims, 2 Drawing Sheets

(56) References Cited

U.S. PATENT DOCUMENTS

| | | | |
|---|---|---|---|
| 7,979,198 B1* | 7/2011 | Kim | G08G 1/091 701/117 |
| 2002/0186974 A1* | 12/2002 | Kitani | G03B 7/26 396/301 |
| 2003/0053469 A1* | 3/2003 | Wentink | H04L 12/5693 370/412 |
| 2003/0087682 A1 | 5/2003 | Cathey et al. | |
| 2005/0009504 A1* | 1/2005 | Kyung | H04W 8/26 455/411 |
| 2007/0046255 A1* | 3/2007 | Kim | H02J 7/345 320/107 |
| 2010/0216460 A1* | 8/2010 | Wu | H04W 48/16 455/434 |
| 2011/0222524 A1* | 9/2011 | Thomson | H04H 40/18 370/339 |

\* cited by examiner

PROVIDING POWER TO DUAL RADIO MODEMS

RELATED APPLICATION

This application was originally filed as PCT Application No. PCT/CN2011/073173 filed Apr. 22, 2011.

FIELD OF THE INVENTION

This relates to providing power to dual radio modems.

BACKGROUND TO THE INVENTION

It has been known for portable communication devices, such as mobile phones, to be provided with dual subscriber identity module (SIM) cards. Switching between SIM cards, however, traditionally required the mobile phone to be restarted. There has been one recent instance of two radio modems being included in a mobile phone, each modem relating to a different SIM card, thereby allowing two SIM cards to be active simultaneously. Accommodating two active SIM cards in a device presents numerous design challenges.

SUMMARY OF THE INVENTION

According to the invention, there is provided apparatus comprising;
a first radio modem having an associated first radio frequency power amplifier;
a second radio modem having an associated second radio frequency power amplifier;
a terminal for connection to a battery;
a capacitor having first and second terminals;
a current limiting switch having input and output terminals; and
a direct current-direct current converter having an input and an output, wherein:
the terminal is coupled to the first radio frequency power amplifier,
the terminal is coupled to the input of the current limiting switch,
the output of the current limiting switch is coupled to both the first terminal of the capacitor and the input of the direct current-direct current converter, and
the output of the direct current-direct current converter is coupled to the second radio frequency power amplifier.

The first terminal of the capacitor may be coupled to a power management unit input of the second radio modem bypassing the direct current-direct current converter.

The capacitor may be a supercapacitor.

The apparatus may comprise:
a second capacitor having first and second terminals;
a second current limiting switch having an input and an output; and
a second direct current-direct current converter having an input and an output, wherein:
the terminal is coupled to the input of the second current limiting switch,
the output of the second current limiting switch is coupled to both the first terminal of the second capacitor and the input of the second direct current-direct current converter, and
the output of the second direct current-direct current converter is coupled to the first radio frequency power amplifier.

Here, the first terminal of the second capacitor is coupled to a power management unit input of the first radio modem bypassing the second direct current-direct current converter.

Alternatively or in addition, the second capacitor may be a supercapacitor.

A current limit value of the first current limiting switch may be less than a current limit value of the second current limiting switch.

Each of the first and second radio modems may be a burst transmission modem.

Each of the first and second radio modems may be a time division multiple access modem.

Each of the first and second radio modems may be a global system for mobiles modem, a universal mobile telephone system modem or a long term evolution modem.

Each of the first and second radio modems may be a global system for mobiles modem or a universal mobile telephone system modem.

One of the first and second radio modems may be a global system for mobiles modem and the other of the first and second radio modems may be a universal mobile telephone system modem.

The apparatus may be incorporated into a portable communications device.

BRIEF DESCRIPTION OF THE DRAWINGS

Embodiments will now be described, by way of example only, with reference to the accompanying drawings, in which.

DETAILED DESCRIPTION OF THE EMBODIMENTS

Figure 1:
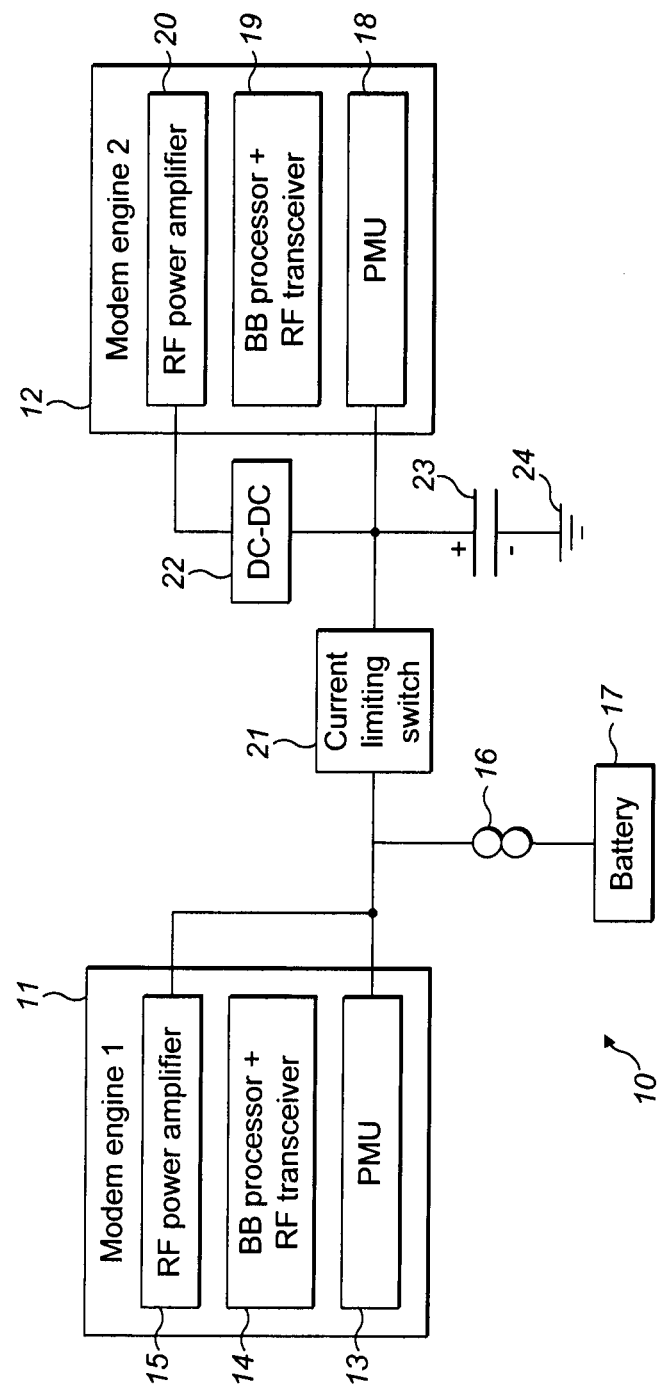
FIG. 1 is a schematic drawing of a first embodiment of a dual modem device according to the invention.

In FIG. 1, a device 10 includes first and second modem engines 11, 12. These may also be termed engines 11, 12. The first modem engine. 11 includes a power management unit (PMU) 13, a baseband (BB) processor and radio frequency (RF) transceiver module 14 and an RF power amplifier 15. The device 10 is a portable communications device, for instance a mobile phone, smartphone, personal digital assistant, laptop computer, tablet computer, etc. Because the device 10 has two modem engines 11, 12, it can be termed a dual modem device.

In this example, the first modem engine 11 is a GSM (Global System for Mobiles) engine. The first engine 11 thus is configured to transmit and receive signals according to a time-divided communication technique. In GSM, time slots are 577 microseconds in length and a burst comprises 8 time slots so has a duration of 4.616 milliseconds.

The first engine 11 is configured to transmit and receive voice data. Voice data utilises one time slot in a burst for transmission and one slot for reception.

The first engine 11 also is configured to transmit and receive non-voice data using GRPS (General Packet Radio Service). Transmission of data in GPRS can utilise more than one time slot of a burst. The first engine 11 transmits in relatively short bursts, with periods of no transmission between bursts.

The PMU 13 provides a function of power management for the first modem engine 11.

The BB processor and RF transceiver 14 provides two functions. The first function, baseband processing, involves the processing of voice data and non-voice data at baseband (i.e. without intermediate frequency (IF) or RF modulation). This applies to data that is generated within the device 10 for transmission as well to data that is received wirelessly at the device. The second function, RF transceiving, involves modulating baseband data onto an RF carrier for transmission and demodulating received RF signals such as to provide baseband signals from which data can be decoded for use within the device 10.

The RF power amplifier 15 has a function of amplifying a radio frequency signal provided by the BB processor and RF transceiver 14 for transmission via an antenna (not shown). The power of the transmitted signal is dependent on a power control signal received from a base station (not shown) with which the device 10 is communicating. Power needed for transmission typically is many orders higher than power needed to amplify a received RF signal for demodulating by the transceiver.

Electrical power is provided by a terminal 16 for connection to a battery 17. The battery 17 may or may not be removable from the device 10, but preferably is removable by a user without the need for special tools.

The terminal 16 is coupled directly to both the PMU 13 and the RF power amplifier 15 so as to supply power thereto by providing electrical energy from the battery 17 directly to each of those components. The PMU 13 uses the connection to the battery 17 to power itself and to provide power to various components of the first modem engine 11 as and when required, as dictated by a controller (not shown) of the first modem engine 11. The RF power amplifier 15 uses its connection to the battery 17 as a source for electrical power with which to amplify signals for transmission as and when controlled to do so by the controller (not shown).

When receiving voice data or non-voice data, the first modem engine 11 operates as follows. The PMU 13 receives electrical power from the battery 17 and distributes it to the BB processor and RF transceiver 14, which demodulates the received RF signal and processes the resulting baseband signal to extract the voice or non-voice data therefrom. A low noise amplifier (LNA) (not shown) forming part of the BB processor and RF transceiver 14 amplifies a received RF signal using electrical power provided by the PMU 13. The LNA of the first modem engine 11 is activated to receive RF (signal) in the relevant time slots of the GSM burst periods. Peak current consumption by the first modem engine 11 during signal reception is of the order of tens of milliAmps.

When transmitting voice data or non-voice data, the first modem engine 11 operates as follows. The PMU 13 receives electrical power from the battery 17 and distributes it to the BB processor and RF transceiver 14, which processes the raw voice or non-voice data at baseband to prepare it for transmission and then modulates it onto an RF carrier signal. The RF power amplifier 15 amplifies the resulting RF signal to the appropriate power level using electrical power provided by the battery 17 without having been distributed by the PMU 13. The first modem engine 11 transmits RF packets in the relevant time slots of the GSM burst periods. Peak current draw by the first modem engine 11 when transmitting at full or maximum power can be around 2.3 Amps in current GSM modems. In this example, the first GSM engine 11 supports continuous uplink multi-time slot for a data connection using GPRS.

In this example, the second modem engine 12 also is a GSM engine. In this example, the second GSM engine 12 serves as a voice modem. The second engine 12 transmits in relatively short bursts, with periods of no transmission between bursts. Each of the first and second engines 11, 12 is a TDMA (time division multiple access) modem.

The second modem engine 12 includes a PMU 18, a BB processor and RF transceiver module 19 and an RF power amplifier 20. The second modem engine 12 is the same as the first modem engine 11. The components within the second modem engine 11 are the same as the corresponding components within the first modem engine 11 and operate in the same way.

Electrical power for the second modem engine 12 is provided by the battery 17 via the battery terminal 16. However, the supply of power is different for the second modem engine 12, as will now be described.

A current limiting switch 21 has an input coupled to the battery terminal 16 and an output coupled to the power input of the PMU 18. A DC-DC converter 22, for instance a buck/boost converter, has an input coupled to the output of the current limiting switch 21 and an output coupled to the power input of the RF power amplifier 20. A capacitor 23 is coupled between the output of the current limiting switch 21 and ground potential 24. Ground potential here is related to a ground or negative terminal (not shown) of the battery 17.

The current limiting switch 21 is an electronic circuit that is configured to pass electric current up to a maximum current and to limit current to that maximum. The current limit of the current limiting switch 21 may take any suitable value. In this example, the current limit of the current limiting switch 21 is 700 mA. The current limiting switch 21 may take any suitable form, and numerous suitable switches are known in the art. Current limiting switches may also be known as current limit switches, and also as load switches with current limiting function.

The DC-DC converter 22 is an electrical circuit that is operable to provide an output voltage at a certain level. The DC-DC converter 22 includes circuits that are operable to provide the required output voltage regardless of whether the input voltage is higher or lower than the required output voltage. Buck/boost circuits suitable for this purpose are well known in the art. In this example, the DC-DC converter 22 is configured to provide an output voltage of 3.0 Volts.

The capacitor 23 is a high value capacitor that is operable to store charge. The capacitor 23 in this example is a low ESR (equivalent series resistance) capacitor. The capacitor 23 in this example has a capacitance of 330 microFarads. The capacitor 23 may be a supercapacitor, also known as an electric double-layer capacitor (EDLC).

Operation will now be described.

In the absence of significant power draw from the MILT 18 and the RF power amplifier 20, the capacitor 23 begins to charge with current provided through the current limit switch 21 when the battery 17 is first coupled and the current limiting switch 21 is enabled. Initially the capacitor 23 has a low or zero voltage across its terminals. As such, its low ESR means that it is able to accept a large current, even with a relatively low potential difference. Accepted current is stored as charge in the capacitor 23. The current that is provided to the capacitor 23 is however limited to the current limit of the current limiting switch 21. The current is limited by virtue of the current limiting switch 21 reducing the voltage at its output to a voltage where the current limit is provided. In the initial charging of the capacitor 23, this results in the capacitor 23 charging more slowly than it would in the absence of the current limiting switch 21.

Once the voltage across the capacitor 23, which has a relationship with the voltage at the output of the current limiting switch 21, has risen to a certain value, the voltage at the output of the current limiting switch 21 is the normal output voltage of the current limiting switch 21. The normal output voltage of course is related to the voltage at the input of the current limiting switch 21. If the current limiting switch has no voltage drop across its terminals, the voltage at the output is the voltage provided by the battery 17. At this stage, the current that would be drawn into the capacitor 23 (ignoring current draw by other components) has reached the value of the current limit of the current limiting switch 21. Thereafter, the capacitor 23 continues to charge although the current flowing into the capacitor 23 is less than the current limit of the current limiting switch 21, and the current declines further over time. Eventually, current through the current limiting switch 21 would stop as the capacitor 23 became fully charged, at least fully charged for the voltage provided at the output of the current limiting switch 21 (although application of a higher voltage would cause further charging).

Once it has been charged to a significant degree, the capacitor 23 is able to provide stored charge as current. It will be appreciated that charge stored in the capacitor 23 is provided as current when the voltage across the capacitor 23 exceeds the voltage that would be is provided at the output of the current limiting switch 21 by action of the current limiting switch 21 alone. This condition occurs primarily when the current limiting switch 21 is passing current at its current limit, i.e. when it is limiting current passing therethrough, although it can also occur when the battery voltage drops.

As long as the voltage at the input of the PMU 18 is above the minimum operating voltage of the PMU 18, the PMU 18 is able to operate correctly. In practical terms, the voltage at the input of the PMU 18 is below the minimum operating voltage only for a short period whilst the capacitor 23 is first being charged. If the PMU 18 is active, the second modem engine 12 is able to operate.

The current drawn by the RF power amplifier 20 varies depending on the power required to perform its function. When the RF power amplifier 20 is transmitting or receiving radio signals, the DC-DC converter 22 draws sufficient current into its input in order to maintain its output at the required output voltage, which in this example is 3.0 Volts.

In the case of receiving radio signals, the total current drawn by the DC-DC converter 22 and the PMU 18 is less than the current limit of the current limiting switch 21. As such, when receiving, the voltage across the capacitor, and thus the voltage at the input of the DC-DC converter 22, the input of the PMU 18 and the output of the current limiting switch 21, remains generally constant.

When transmitting, however, the current drawn by the DC-DC converter 22 increases considerably and the total current drawn by the DC-DC converter and the PMU 18 in order to maintain the voltage at the input of the RF power amplifier 20 at the required voltage, in this example 3.0 Volts, can exceed the current limit of the current limiting switch 21. For the duration of the current draw of the DC-DC converter 22 and PMU 18 exceeding the current limit of the current limit switch 21, the additional current (the current w above the current limit of the current limiting switch 21) is provided by discharge of the capacitor 23. As the capacitor 23 discharges to provide the current needed by the DC-DC converter 22 and the PMU 18, the voltage across the capacitor 23, and thus the voltage at the output of the current limiting switch 21 and at the input of the PMU 18, decreases. Incidentally, the voltage across the DC-DC converter 22 also changes, and the sign of the Is change depends on whether the voltage at the input of the DC-DC converter 22 is higher or lower than the voltage at the output of the DC-DC converter 22.

Once the current drawn by the combination of the DC-DC converter 22 and the PMU 18 falls again below the current limit of the current limiting switch 21, the voltage at the output of the current limiting switch 21 begins to rise. This results in re-charging of the capacitor 23. The current passing through the current limiting switch 23 remains at the current limit until the voltage at the output of the current limiting switch 22 is at the normal output voltage. This occurs when the sum of the current drawn by the charging of the capacitor 23, the current drawn by the PMU 18 and the current drawn by the DC-DC converter 22 falls below the current limit of the current limiting switch 21.

Typically, the capacitor 23 is discharged during a transmission time slot and is re-charged from the end of the transmit time slot. The rate of re-charge depends on the voltage at the output of the current limiting switch 21, so the voltage starts relatively high and decreases as the capacitor 23 charges. The capacitor 23 typically is drawing relatively little current by the time the next transmit slot begins and current is again drawn from the capacitor 23 to supplement the current provided by the current limit switch 21.

The voltage at the node between the PMU 18, the capacitor 23, the DC-DC converter 22 and the current limiting switch 21 increases and decreases as the current draw of the DC-DC converter 22 and the PMU 18 varies as the second modem engine 12 performs its functions. All the while, the current drawn from the battery 17 in respect of the second modem engine 12 does not exceed the current limit of the current limit switch 21. In effect, the arrangement of the capacitor 23 and the current limiting switch 21 smoothes out the demand for current from the battery 17.

An effect of the above-described arrangement is that the maximum current draw from the battery to power the first and second modem engines 11, 12 is equal to the sum of the maximum power draw of the first modem engine 11 and the current limit of the current limiting switch 21. In the example where the maximum power draw of a modem engine is 2.3 Amps and the current limit of the current limiting switch 21 is 700 mA, the maximum current that can be drawn by the modem engines 11, 12 is 3.0 Amps even when both modems are transmitting at full transmit power simultaneously. Without the arrangement described, the maximum current that could be drawn during simultaneous transmission by both modem engines 11, 12 is 4.6 Amps. The arrangement thus can reduce peak current draw on the battery 17 by 1.6 Amps, or 35%, in this example, although the extent of peak current reduction clearly will vary for different arrangements.

This reduction in peak current provides a number of important advantages, as follows. The advantages include firstly a reduction in the possibility of a battery voltage drop that has a negative effect on the operation of the device 10. The consequences of battery voltage drops can be a failure of components, including the modem engines 11, 12, to perform their required functions correctly. Voltage drop can in extreme cases result in automatic powering off of the device 10, which is highly undesirable except when the remaining battery charge is very low. Another advantage is a reduction in the possibility of overcurrent or overdischarge for the battery, i.e. the current draw exceeding the maximum permitted current discharge of the battery. A still further advantage is the reduced risk of thermal damage to the battery 17. The risk of thermal damage comes from a number of factors, one of which is high current discharge when hot, so the risk is reduced by reducing peak current.

The provision of the DC-DC converter 22 between the capacitor 23 and the RF power amplifier 20 results in the RF power amplifier 20 being provided with a stable voltage, which contributes to a good RF performance. Connecting the RF power amplifier 22 to the capacitor 23 without the intervening DC-DC converter provides a workable embodiment, although with inferior RF performance.

Connection of the PMU 18 directly to the node between the capacitor 23 and the current limiting switch 21 results in power consumed by the PMU 18 not being subject to inefficiencies of the DC-DC converter 22, although at the cost of reduced voltage stability for the PMU 18. However, voltage stability may not be as important for the PMU 18 as it is for the RF power amplifier 20. In other embodiments (not shown), the PMU 18 is coupled to the battery terminal directly instead of through the current limiting switch 21.

Another advantage of the provision of the DC-DC converter 22 between the capacitor 23 and the RF power amplifier 20 is the storage of more charge in the capacitor 23 for a given capacitance as long as the voltage at the node between the capacitor 23 and the current limiting switch 21 is higher than the voltage required at the input of the RF power amplifier 20. This allows the use of a lower capacitance capacitor 23, compared to an embodiment in which the DC-DC converter is located between the capacitor 23 and the battery 17, which allows the capacitor 23 to be smaller in size and cheaper to manufacture.

Another advantage is reduced power consumption by the power amplifier 20, which results in an increased talk time (or, put another way, increased battery re-charge intervals). This advantage stems from the fact that, for a given transmitting power level of the RE power amplifier 20, the current flowing through the RF power amplifier 20 is lower as long as the voltage at the node between the capacitor 23 and the current limiting switch 21 is higher than the voltage required at the input of the RF power amplifier 20. Assuming that the voltage at the node between the capacitor 23 and the current limiting switch 21 is equal to the battery voltage, the power saving (ignoring losses in the DC-DC converter 22) is 28% for a battery voltage of 4.2V, 18% for a battery voltage of 3.7V and 14% for a battery voltage of 3.5V. Since a significant proportion of power consumption derives from the power amplifier 20 during transmission, this feature can result in a significant overall power consumption saving or reduction.

The value of the capacitor 23 is selected such as to allow a sufficiently high probability that the second modem engine 12 is able to function to its maximum capacity as long as the voltage provided by the battery exceeds a minimum voltage, which preferably corresponds to a low battery charge condition such as 5% or 10% charge remaining. The value of the capacitor 23 thus depends on the current limit of the current limiting switch 21 as well as parameters of the second modem engine 12 such as the maximum current draw and the maximum number of time slots within a burst for which the second modem engine 12 is permitted to transmit. The value of the capacitor 23 preferably exceeds 100 microFarads, more preferably exceeds 200 microFarads, and further preferably exceeds 300 microFarads. The value for the capacitor 23 may be equal to or less than 1 milliFarad, preferably is 750 microFarads or less and more preferably is 500 microFarads or less. The optimum value of capacitance depends on the number of consecutive time slots on which the modem 11, 12 may be required to transmit. For a GSM modem that is required to transmit on only one time slot in a burst, 330 uF is a suitable value. For two consecutive time slots in a burst, 660 uF or 750 uF would be sufficient. For three consecutive time slots, 1000 uF is a suitable value. The optimum value for the capacitance varies for different radio standards.

The value for the current limit of the current limiting switch 21 is selected such as to allow a sufficiently high probability that the second modem engine 12 is able to function to its maximum capacity as long as the voltage provided by the battery exceeds a minimum voltage, that preferably corresponds to a low battery charge condition such as 5% or 10% charge remaining. The value for the current limit of the current limiting switch 21 thus depends on the value of the capacitor 23 as well as parameters of the second modem engine 12 such as the maximum current draw and the maximum number of time slots within a burst for which the second modem engine 12 is permitted to transmit. It also depends on factors such as nominal battery voltage, battery parameters such as maximum current discharge and internal resistance, and parameters of the first modem engine 11 such as the peak current consumption thereof. The value for the current limit of the current limiting switch 21 also depends on factors relating to control of the first and second modem engines 11, 12, for instance any restrictions that may be in place in relation to the maximum transmit power of the first modem engine 11 whilst the second modem engine 12 is transmitting.

Features that are not relevant to this discussion are omitted from the FIG. 1, although it will be appreciated that the device 10 include numerous other elements, including a display, input device, a processor, memory, etc.

Figure 2:
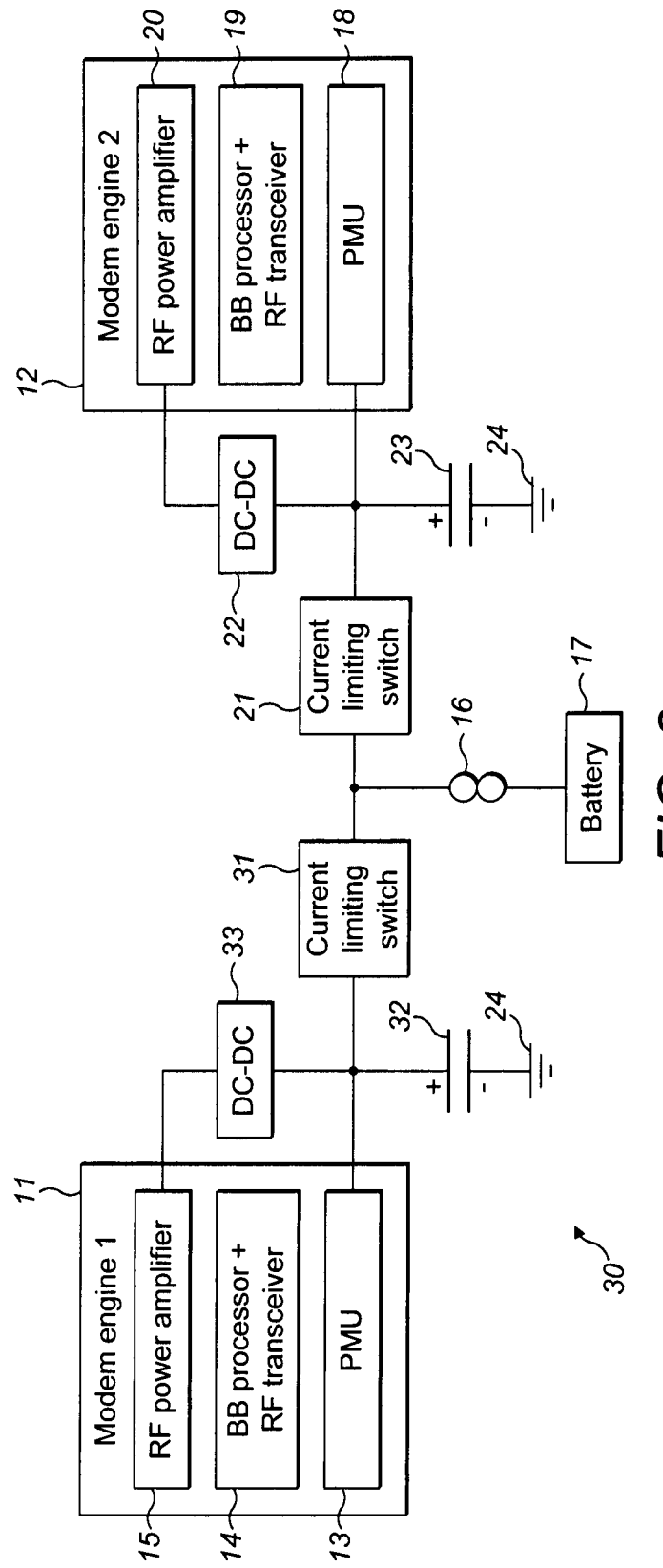
FIG. 2 is a schematic drawing of a second embodiment of a dual modem device according to the invention.

A second embodiment will now be described with reference to FIG. 2. The above description of the components of FIG. 1, along with the description of operation, are hereby explicitly incorporated into FIG. 2 by reference and only the differences in features and operation will now be described with reference to FIG. 2. In FIG. 2, a device 20 is shown.

In FIG. 2, the first modem engine 11 is not coupled directly to the battery terminal 16. Instead, a second current limiting switch 31 has an input coupled to the battery terminal 16 and an output coupled to the input of the PMU 13. A second capacitor 24 is coupled between ground potential 24 and the node between the PMU 13 and the second current limiting switch 31. A second DC-DC converter 33 has an input coupled to the node between the PMU 13, the second current limiting switch 31 and the second capacitor 32 and an output coupled to the power input of the RF power amplifier 15. Thus, the second capacitor 32, the second current limiting switch 31 and the second DC-DC converter 33 form an arrangement with respect to the first modem engine 11 that corresponds exactly with the arrangement formed with respect to the second modem engine 12.

There is a difference in that the current limit of the second current limiting switch 31 has a different value to that of the first current limiting switch 21. In this example, the current limit of the second current limiting switch 31 is 1500 mA. Also, the capacitance of the second capacitor 32 is lower than that of the first capacitor 23. This allows the first GSM engine 11 to transmit in multiple consecutive time slots within a burst, thereby allowing a higher transmit data rate. For instance, the first capacitor 23 may have a value of 660 microFarads or 750 microFarads. Together with the higher current limit of the first current limiting switch 21, this allows the first engine 11 to transmit in two consecutive time slots in a burst. The second GSM engine 12 is controlled so as not to transmit in multiple time slots within a burst. However, voice does not require the use of multiple time slots within a burst.

With the arrangement of FIG. 2, the maximum current that is drawn from the battery 17 by the first and second modem engines 11, 12 is equal to the sum of the current limits of the first and second current limit switches 21, 31. In this example, the maximum current draw is 2.2 Amps.

This further reduction in peak current provides a number of advantages over the FIG. 1 arrangement, as follows. The advantages include firstly a further reduction in the possibility of a battery voltage drop that has an effect on operation of the device. Another advantage is a further reduction in the possibility of overcurrent or overdischarge for the battery. A still further advantage is a further reduced risk of thermal damage to the battery 17.

Furthermore, the arrangement allows the use of different battery technology without any reduction in performance of the dual modems 11, 12. In particular, the arrangement allows the use of a battery 17 with a lower maximum current discharge rating.

Also, although the engines 11, 12 are described as including respective BB processing and RF transceiver modules, in other embodiments a single BB processing module is shared by both engines 11, 12. Here, each engine 11, 12 includes a respective RF power amplifier and RF transceiver. Except for sharing a BB processing module, these embodiments are the same as the other embodiments described above.

In further embodiments, only one engine is provided. In these embodiments, the engine includes first and second RF transceivers and a single BB processing module. First and second power amplifiers are external to the engine and are fed by signals from respective ones of the RF transceivers within the engine. Otherwise, these embodiments are the same as the other embodiments described above.

It will be appreciated that the above-described embodiments are purely illustrative and are not limiting on the scope of protection. Numerous alternatives will be envisaged by the skilled person. For instance, although in the above embodiments the modem engines 11, 12 are GSM modems, either or both may take another form. For instance, the first modem may be a GSM modem and the second may be a UMTS (universal mobile telephony system) or 3G modem. Alternatively, one or both of the modems may be an LIE (long term evolution) or 4G modem. The advantages provided by the features described above are most prominent where both modems transmit in relatively short bursts, with periods of no transmission between bursts, where transmission requires a relatively high current consumption. Such modems typically are TDMA (time division multiple access) modems.

The invention claimed is:

1. Apparatus comprising:
   a first radio modem having an associated first radio frequency power amplifier;
   a second radio modem having an associated second radio frequency power amplifier;
   a terminal for connection to a battery;
   a capacitor having first and second terminals;
   a first current limiting switch having input and output terminals; and
   a first direct current-direct current converter having an input and an output,
   wherein:
   the terminal is coupled to the input of the first current limiting switch,
   the output of the first current limiting switch is coupled to both the first terminal of the capacitor and the input of the first direct current-direct current converter, and
   the output of the first direct current-direct current converter is coupled to the second radio frequency power amplifier; the apparatus further comprising
   a second capacitor having first and second terminals;
   a second current limiting switch having an input and an output; and
   a second direct current-direct current converter having an input and an output,
   wherein:
   the terminal is coupled to the input of the second current limiting switch,
   the output of the second current limiting switch is coupled to both the first terminal of the second capacitor and the input of the second direct current-direct current converter, and
   the output of the second direct current-direct current converter is coupled to the first radio frequency power amplifier;
   wherein for a case where the first radio frequency power amplifier and the second radio frequency power amplifier each simultaneously transmit at substantially full power the first current limiting switch is operated so as to provide a current flow from the battery to the input of the first direct current-direct current converter and the second current limiting switch is operated so as to provide a current flow from the battery to the input of the second direct current-direct current converter, and
   wherein each of the first radio modem and the second radio modem is a burst transmission modem.

2. The apparatus as claimed in claim 1, wherein the first terminal of the capacitor is coupled to a power management unit input of the second radio modem bypassing the direct current-direct current converter.

3. The apparatus as claimed in claim 1, wherein the capacitor is a supercapacitor.

4. The apparatus as claimed in claim 1, wherein the first terminal of the second capacitor is coupled to a power management unit input of the first radio modem bypassing the second direct current-direct current converter.

5. The apparatus as claimed in claim 1, wherein the second capacitor is a supercapacitor.

6. The apparatus as claimed in claim 1, wherein a current limit value of the first current limiting switch is less than a current limit value of the second current limiting switch.

7. The apparatus as claimed in claim 1, wherein at least one of the first and second radio modems is a long term evolution modem.

8. The apparatus as claimed in claim 1, wherein each of the first and second radio modems is a time division multiple access modem.

9. The apparatus as claimed in claim 1, wherein each of the first and second radio modems is a global system for mobiles modem, a universal mobile telephone system modem or a long term evolution modem.

10. The apparatus as claimed in claim 1, wherein each of the first and second radio modems is a global system for mobiles modem or a universal mobile telephone system modem.

11. The apparatus as claimed in claim 1, wherein one of the first and second radio modems is a global system for mobiles modem and the other of the first and second radio modems is a universal mobile telephone system modem.

12. The apparatus as claimed in claim 1, incorporated into a portable communications device.

13. An apparatus comprising:
a first radio modem having an associated first radio frequency power amplifier;
a second radio modem having an associated second radio frequency power amplifier;
a terminal for connection to a battery;
a first capacitor having first and second terminals;
a first current limiting switch having input and output terminals; and
a first direct current-direct current converter having an input and an output,
wherein:
the terminal is coupled to the input of the first current limiting switch,
the output of the first current limiting switch is coupled to both the first terminal of the first capacitor and the input of the first direct current-direct current converter, and
the output of the first direct current-direct current converter is coupled to the second radio frequency power amplifier; the apparatus further comprising
a second capacitor having first and second terminals;
a second current limiting switch having an input and an output; and
a second direct current-direct current converter having an input and an output,
wherein:
the terminal is coupled to the input of the second current limiting switch,
the output of the second current limiting switch is coupled to both the first terminal of the second capacitor and the input of the second direct current-direct current converter, and
the output of the second direct current-direct current converter is coupled to the first radio frequency power amplifier; and wherein
a current limit value of the first current limiting switch is less than a current limit value of the second current limiting switch.

14. The apparatus as claimed in claim 13, wherein the first terminal of the first capacitor is coupled to a power management unit input of the second radio modem bypassing the direct current-direct current converter, and wherein the first terminal of the second capacitor is coupled to a power management unit input of the first radio modem bypassing the second direct current-direct current converter.

15. The apparatus as claimed in claim 13, wherein each of the first radio modem and the second radio modem is a burst transmission modem.

16. The apparatus as claimed in claim 13, wherein each of the first radio modem and the second radio modem is a time division multiple access modem.

17. The apparatus as claimed in claim 13, wherein each of the first and second radio modems is a global system for mobiles modem, a universal mobile telephone system modem, or a long term evolution modem.

18. The apparatus as claimed in claim 13, wherein one of the first and second radio modems is a global system for mobiles modem and the other of the first and second radio modems is a universal mobile telephone system modem.

19. The apparatus as claimed in claim 13, wherein at least one of the first radio modem and the second radio modem is a long term evolution (LTE) radio modem.

* * * * *